United States Patent
Fukuno (10) Patent No.: US 11,456,594 B2
(45) Date of Patent: Sep. 27, 2022

(54) DC POWER DISTRIBUTION SYSTEM

(71) Applicant: Mitsubishi Electric Corporation, Tokyo (JP)

(72) Inventor: Kenichi Fukuno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/265,027

(22) PCT Filed: Jan. 28, 2019

(86) PCT No.: PCT/JP2019/002643
§ 371 (c)(1),
(2) Date: Feb. 1, 2021

(87) PCT Pub. No.: WO2020/070905
PCT Pub. Date: Apr. 9, 2020

(65) Prior Publication Data
US 2021/0313797 A1 Oct. 7, 2021

(30) Foreign Application Priority Data
Oct. 1, 2018 (JP) .............................. JP2018-186333

(51) Int. Cl.
*H02H 7/22* (2006.01)
*H02H 1/00* (2006.01)
*H02J 1/00* (2006.01)

(52) U.S. Cl.
CPC ............ *H02H 7/22* (2013.01); *H02H 1/0007* (2013.01); *H02J 1/00* (2013.01)

(58) Field of Classification Search
CPC ........ H02H 1/0007; H02H 3/087; H02H 7/22; H02H 7/268; H02J 1/00; H02J 13/00036
(Continued)

(56) References Cited

U.S. PATENT DOCUMENTS

| 2013/0021707 A1* | 1/2013 | Bang ........................ H02H 7/30 361/93.9 |
| 2013/0278056 A1* | 10/2013 | Koizumi ............. H02J 7/00714 307/18 |
| 2016/0352091 A1* | 12/2016 | Qi ........................... H02H 3/445 |

FOREIGN PATENT DOCUMENTS

| CN | 107482634 A | * 12/2017 | ................ H02J 3/06 |
| CN | 104281977 B | * 2/2018 | ............. G06Q 50/06 |

(Continued)

OTHER PUBLICATIONS

International Search Report (PCT/ISA/210) with translation and Written Opinion (PCT/ISA/237) dated Apr. 23, 2019, by the Japan Patent Office as the International Searching Authority for International Application No. PCT/JP2019/002643.

(Continued)

*Primary Examiner* — Kevin J Comber
(74) *Attorney, Agent, or Firm* — Buchanan Ingersoll & Rooney PC (57) ABSTRACT

In the conventional elimination of a short-circuited point by using fuses, due to the fuse characteristics, it is not possible to ensure cooperation at the respective melting times of fuses in a short-circuit state. To solve such a problem, provided are a converter which limits a current passing through a distribution line in a short-circuit state and has a constant power drooping characteristic of passing a current greater than or equal to a rated current through the distribution line for a fixed time, and relays which have an operating characteristic of detecting a current greater than or equal to the rated current and hierarchically opening switches within the fixed time.

15 Claims, 8 Drawing Sheets

(58) Field of Classification Search
USPC .......................................................... 361/87
See application file for complete search history.

(56) References Cited

FOREIGN PATENT DOCUMENTS

| | | | | | |
|---|---|---|---|---|---|
| GB | 2269052 A | * | 1/1994 | ............ | H02B 1/056 |
| JP | S6378208 A | | 4/1988 | | |
| JP | 2013009482 A | | 1/2013 | | |
| JP | 2013027306 A | | 2/2013 | | |
| JP | 2013081337 A | * | 5/2013 | | |
| JP | 2013081337 A | | 5/2013 | | |
| JP | 2015163032 A | | 9/2015 | | |
| JP | 2016224050 A | | 12/2016 | | |

OTHER PUBLICATIONS

Office Action (Notice of Reasons for Refusal) dated Sep. 14, 2021, in corresponding Japanese Patent Application No. 2020-549933 and English translation of the Office Action. (9 pages).

\* cited by examiner

DC POWER DISTRIBUTION SYSTEM

TECHNICAL FIELD

The present disclosure relates to the field of a DC power distribution system.

BACKGROUND ART

In recent years, attention has been placed on DC power distribution systems for supplying DC power to loads in office buildings, factories, or station buildings. The existing AC power distribution systems are configured such that, when a short-circuit has occurred, an abnormal current is detected by an overcurrent protection relay, and a short-circuited point is separated from a healthy power distribution system by circuit breakers or similar devices, thus allowing the healthy system to continuously supply power even after short-circuiting (see Patent Document 1, for example).

CITATION LIST

Patent Document

Patent Document 1: Japanese Laid-Open Patent Publication No. 2016-224050

SUMMARY OF THE INVENTION

Problems to be Solved by the Invention

However, a conventional DC power distribution system used in a data center, a communication station, or the like generally eliminates a short-circuited point by using fuses. Due to the fuse characteristics, if fuses are installed at two or more locations on a path from a power feeding portion to a load, it is not possible to ensure cooperation at the respective melting times of the fuses in a short-circuit state.

For this reason, a fuse is generally installed at one location on a path from a power feeding portion to a load. However, the area located on the load side with respect to the fuse is separated from the system in the short-circuit state, so that a power failure may occur over a wide range, depending on the location at which the fuse is installed.

The present disclosure has been made to solve the above problem and an object of the present disclosure is to provide a DC power distribution system capable of reducing the power failure range at the time of occurrence of a short-circuit, thus supplying power in a stable manner.

Solution to the Problems

A DC power distribution system according to one aspect of the present disclosure includes: a converter for converting power from a power supply into DC power; a plurality of distribution lines branched for suppling power from the converter to a plurality of loads; a first switch connected between the converter and a branch of each of the distribution lines to open/close an electric path; a second switch connected between the branch and the corresponding load to open/close an electric path; a first relay for opening the first switch; and a second relay for opening the second switch. The converter limits a current passing through the distribution lines in a short-circuit state, and has a constant power drooping characteristic of passing a current greater than or equal to a rated current through the distribution lines for a fixed time. The first and second relays detect the current greater than or equal to the rated current, and have an operating characteristic of hierarchically opening the first and second switches within the fixed time.

Effect of the Invention

The DC power distribution system according to one aspect of the present disclosure can reliably open an electric path at the time of occurrence of a short-circuit, and reduce the power failure range, thus supplying power in a stable manner.

DESCRIPTION OF EMBODIMENTS

Preferred embodiments of a power control device according to the present disclosure will be described with reference to the drawings. Note that the same subject matter and corresponding parts are denoted by the same reference numerals, and the detailed descriptions thereof have been omitted. Similarly, redundant descriptions of the constituent elements denoted by the same reference numerals have also been omitted in the following embodiments.

Embodiment 1

Figure 1:
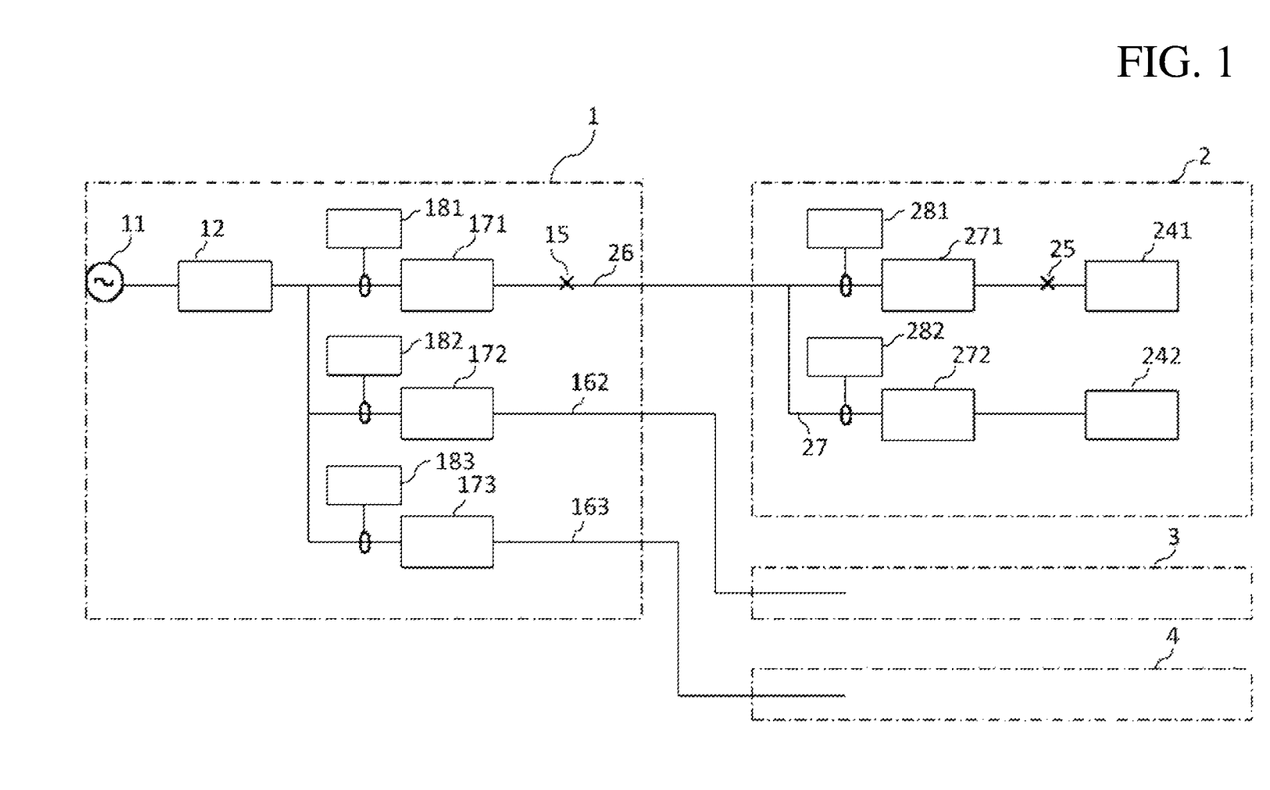
FIG. 1 is a conceptual diagram of a configuration of a DC power distribution system according to Embodiment 1 of the present disclosure.

FIG. 1 shows an example of the configuration of a DC power distribution system according to Embodiment 1 to which the present disclosure is applied. AC power which is supplied from a commercial power supply 11 provided in an electric room 1 is converted into DC power by a converter 12. The converted DC power is transmitted to an electric room 2 by a distribution line 26 via a switch 171 connected to the converter 12. In the electric room 2, a distribution line 27 is branched from the distribution line 26. Accordingly, power is supplied co loads 241 and 242 respectively via switches 271 and 272 connected to the distribution line 26 and the distribution line 27. The switches 171, 271, and 272 are opened at the time of occurrence of a short-circuit current to interrupt the short-circuit current. Relays 181, 281, and 282 are connected in the preceding stages on the distribution lines 26 and 27 to which the switches 171, 271, and 272 are respectively connected, and the relays 181, 281, and 282 detect a short-circuit current and output trip commands (opening commands) to the switches 171, 271, and 272.

The output from the converter 12 is also transmitted to switches 172 and 173 which are connected to the converter 12 so as to be branched therefrom, and power is distributed to an electric room 3 from the switch 172 via a distribution line 162, and to an electric room 4 from the switch 173 via a distribution line 163. Note that the electric room 3 and the electric room 4 are configured to have the same circuit configuration as that of the electric room 2, and therefore the descriptions thereof have been omitted.

Figure 2:
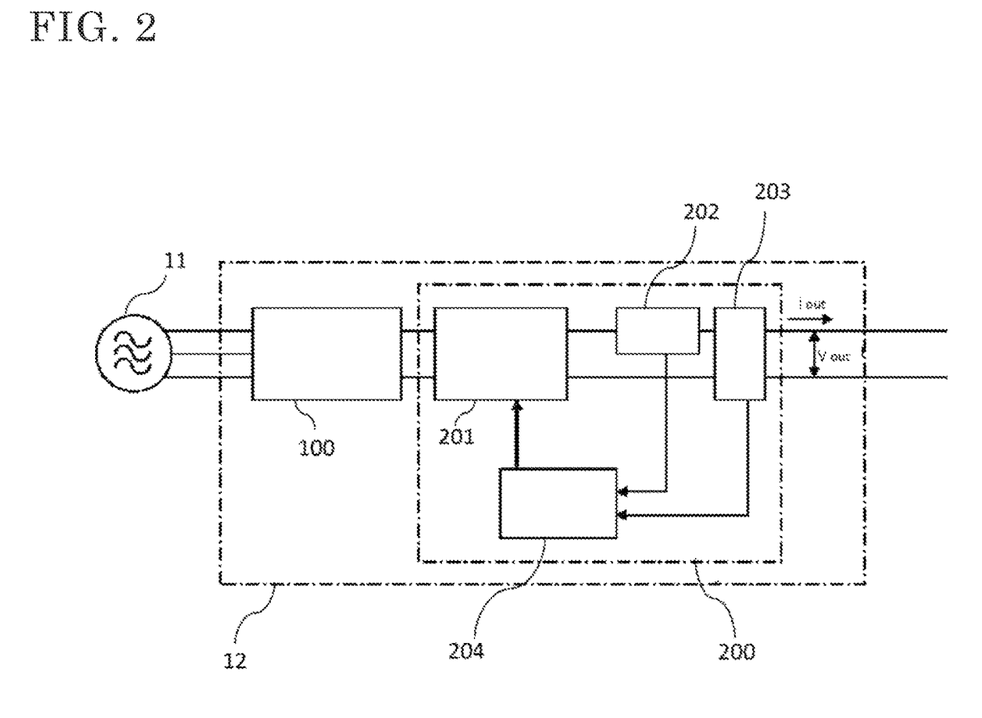
FIG. 2 is a conceptual diagram of a configuration of a converter according to Embodiment 1 of the present disclosure.
Figure 3:
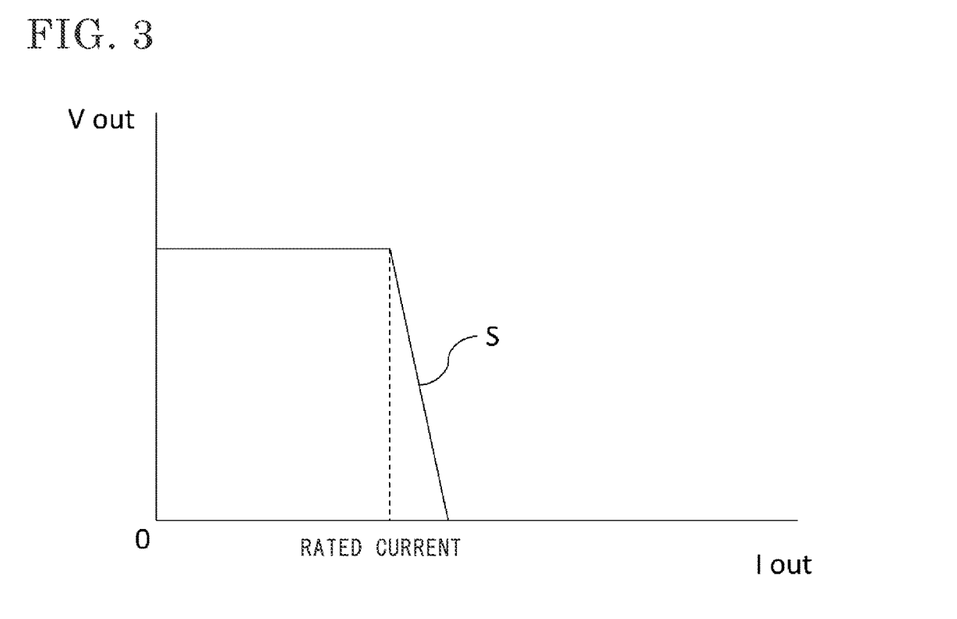
FIG. 3 is a graph showing a constant power drooping characteristic of the converter according to Embodiment 1.

As shown in FIG. 2, the converter 12 includes a rectifying unit 100 for converting AC power into DC power and a current limiting device 200 for limiting an output current from the rectifying unit 100. The current limiting device 200 is composed of a current limiting unit 201 which is formed by a switching element and restricts an output current, a current sensor 202 for measuring an output current, a voltage sensor 203 for measuring an output voltage, and a current-limiting control unit 204 which performs a computation for calculating, from a current measured value measured by the current sensor 202 and a voltage measured value measured by the voltage sensor 203, a switching signal having a value less than or equal to a pre-set maximum output current set value. Due to such a configuration, the switching element of the current limiting unit 201 operates based on the switching signal from the current-limiting control unit 204, whereby the converter 12 has, even in a short-circuit state, a drooping characteristic as shown in FIG. 3, i.e., a characteristic that a predetermined voltage is maintained until a rated current is reached, and an output voltage Vout decreases downward to the right after the rated current has been exceeded. This decrease in output voltage is set such that, when a high current exceeding the rated current has been generated at a point 15 shown in FIG. 1 in an overload state or at the time of occurrence of a short-circuit, the output voltage is rapidly lowered downward to the right as shown in FIG. 3, thus preventing an excessive electric energy from flowing into the switches 171 and 271, and so forth.

Figure 4:
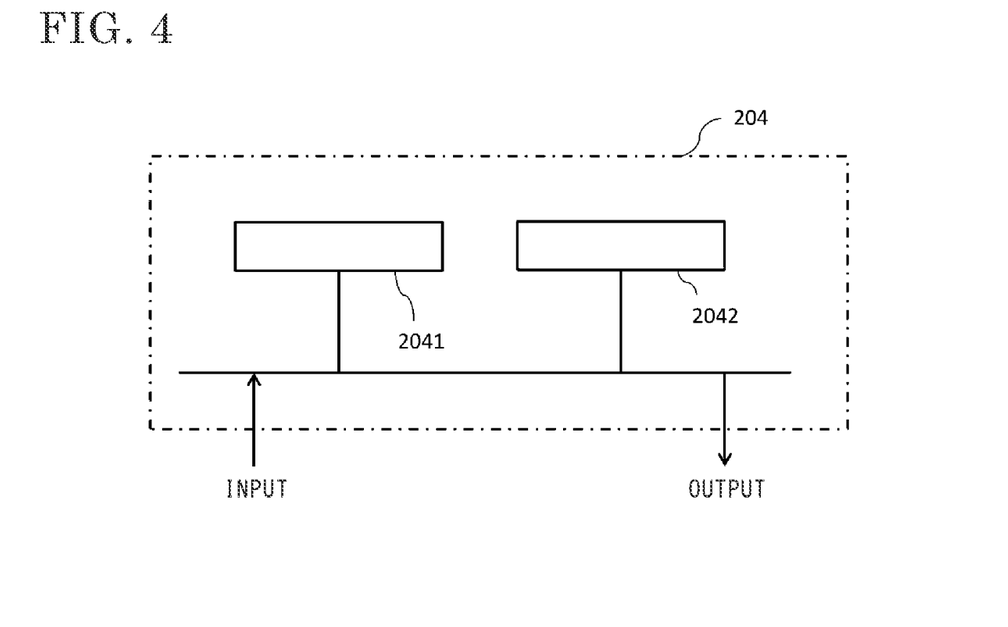
FIG. 4 is a diagram showing an example of a hardware configuration of a current-limiting control unit according to Embodiment 1

FIG. 4 shows an example of hardware of the current-limiting control unit 204. The current-limiting control unit 204 is composed of a processor 2041 and a storage device 2042. Although not shown, the storage device 2042 includes a volatile storage device such as a random access memory, and a nonvolatile auxiliary storage device such as a flash memory. Alternatively, the storage device 2042 may include an auxiliary storage device of a hard disk instead of a flash memory. The processor 2041 performs part or all of the above-described functions by executing a program inputted from the storage device 2042. In this case, the program is inputted from the auxiliary storage device to the processor 2041 via the volatile storage device. The processor 2041 may output data such as a calculation result to the volatile storage device of the storage device 2042, or may store the data into the auxiliary storage device via the volatile storage device.

Figure 5:
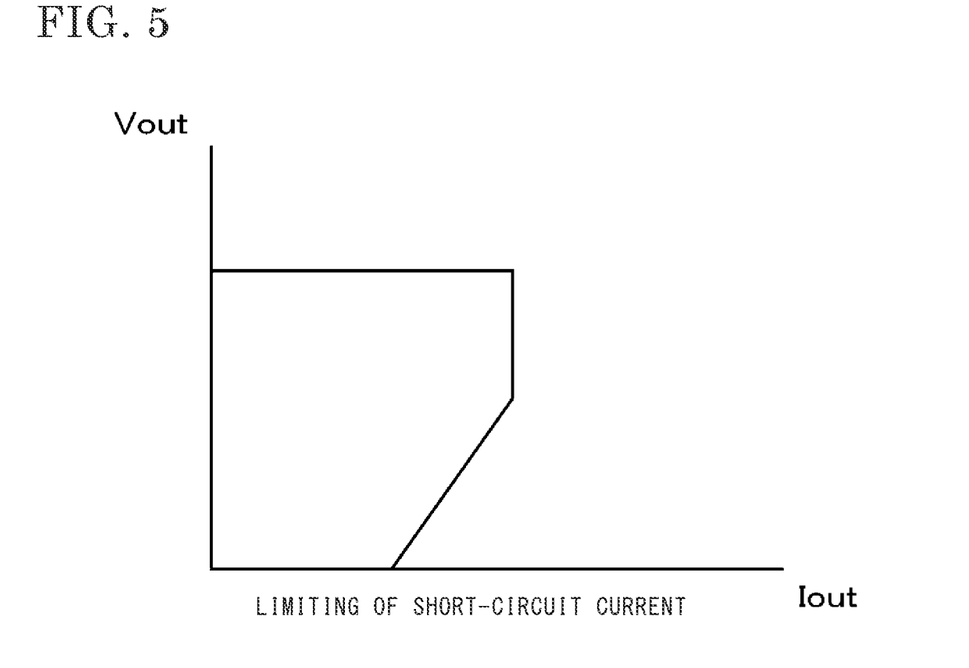
FIG. 5 is a graph showing an example of a drooping characteristic of a current limiting device.

If the drooping characteristic is set so as to restrict the current by lowering the current in the so-called fold-back form as shown in FIG. 5 in order to protect the converter 12 against an overcurrent, it is not possible to supply an energy sufficient to melt a fuse, for example. Accordingly, the healthy system and the short-circuited point cannot be separated from each other, so that the converter 12 may eventually stop, and a power failure may occur over the entire DC power distribution system. Therefore, the drooping characteristic is set as a constant power drooping characteristic of restricting the output current to be less than or equal to a short-time overcurrent such that the converter 12 can maintain the function without failing when a current greater than or equal to the rated current is passed therethrough for a fixed time or less, for example, 2 seconds or less in a short-circuit state. Specifically, the current less than or equal to a short-time overcurrent is determined by the tolerance of the semiconductor element of the rectifying unit 100 inside the converter 12, is therefore different for each device configuration of the converter 12, and is set so as to be a current value which is greater than or equal to the rated current and is up to about 20 times the rated current.

Accordingly, when a short-circuit has occurred at a point 25 shown in FIG. 1, a second time period is ensured which is sufficient to allow the switches 171 to 173 to perform an opening operation after a first time period in which the switches 271 and 272 perform an opening operation for interrupting an overcurrent. The difference between the first and second time periods may be set such that the converter 12 continues passing a current greater than or equal to the rated current for a minimum of 0.1 seconds or more, taking into consideration the time required from the detection of an overcurrent to the separation of the main contacts of the switches 271 and 272. In addition, the time to continue passing the current may be set in the range that the device does not fail, for example, 2 seconds or less, taking a failure of the device into consideration.

In a system in which a switch is provided on a side located further toward the load than the switches 271 and 272, the converter 12 may continue passing a current greater than or equal to the rated current for a minimum of 0.2 seconds or more in order to ensure the difference between the operation time period of the switches 271 and 272 and that of the switch provided on a side located further toward the load than the switches 271 and 272, and the difference between the operation time period of the switches 171 to 173 and that of the switches 271 and 272.

Figure 6:
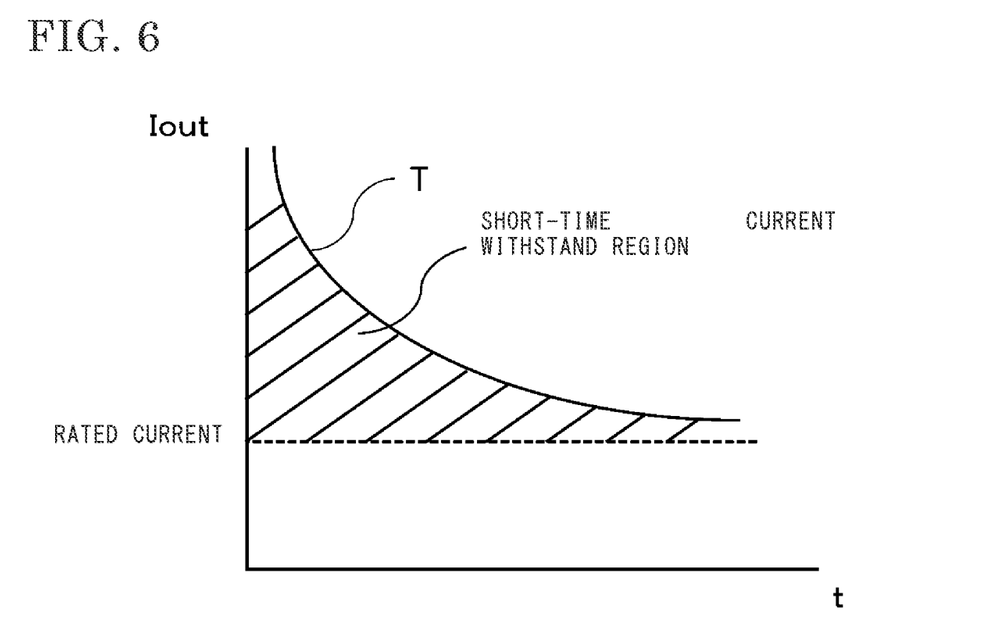
FIG. 6 is a characteristic graph showing an example of a short-time current withstand characteristic of the converter according to Embodiment 1.

FIG. 6 is a characteristic graph showing an example of a short-time current withstand characteristic of the converter 12, in which the horizontal axis represents the current-conduction time t, and the vertical axis represents the output current Iout. The hatched area indicates the range of an allowable short-time withstand current. By having a characteristic of performing an operation when a short-time withstand current conforming to a curve portion T flows therethrough, the relays 181 to 183, 281, and 282 can reliably output trip commands to operate the switches 171 to 173, 271, and 272, thus protecting the DC power distribution system.

Operations of the DC power distribution system including the converter 12 having the drooping characteristic as described above, and the relays 181 to 183, 281, and 282 will be described with reference to FIG. 1.

In FIG. 1, when a short-circuit has occurred at the point 25, a short-circuit current greater than or equal to the rated current flows for a maximum of 2 seconds from the converter 12 via the switch 171 in the electric room 1 and the switch 271 in the electric room 2. Within this period, the relay 181 and the relay 281 detect a short-circuit current. By setting the overcurrent operating time of the relay 131 and the overcurrent operating time of the relay 281 such that the relay 181 operates more slowly than the relay 281, the relay 281 operates first to output a trip command to the switch 271, so that the switch 271 is opened before the switch 171. Consequently, the point 25 is separated from a healthy circuit, so that a power failure occurs only in the load 241, and the healthy circuit (distribution line 27) can continuously distribute power to the load 242.

In FIG. 1, when a short-circuit has occurred at the point 15, the short-circuit current flows through the point 15 from the converter 12 via the switch 171 in the electric room 1. Consequently, the relay 181 operates to open the switch 171, so that a power failure occurs only in the loads in the electric room 2. Accordingly, power can be continuously distributed to the loads in the electric room 3 and the loads in the electric room 4.

Although the configuration shown in FIG. 1 is a two-device configuration composed of a relay serving as the mechanism for detecting a short-circuit current and a switch for interrupting the short-circuit current in accordance with a command from the relay, it is possible to adopt a configuration in which a device having the functions of both a relay and a switch, for example, an MCCB (Molded Case Circuit Breaker) or a fuse is connected in series to the distribution line 26 or the distribution line 27. In this case, it is necessary that the operation time period at a short-circuit current is ensured in the overcurrent operating characteristic of the MCCB or the operating characteristic of the fuse. In the case of the operating characteristic of the fuse, the operating characteristic is set such that the fuse operates for a current exceeding the upper limit current at which a normal protection function as the switch can be maintained. In the case of the MCCB, the instantaneous operating threshold of the MCCB is approximately 20 times the rated current of the MCCB, and a current value which is about 20 times the rated current is set as a current value at which the MCCB can be operated by an instantaneous element even if a short-circuit occurs in the immediate vicinity of the secondary side of the converter.

In this manner, when a short-circuit has occurred, it is possible to control the characteristic of limiting a short-circuit current by the converter 12 in which the current limiting device 200 is incorporated, and to ensure the protection cooperation between the relay and the switch, thus limiting the power failure range as much as possible without stopping the entire DC power distribution system.

Figure 7:
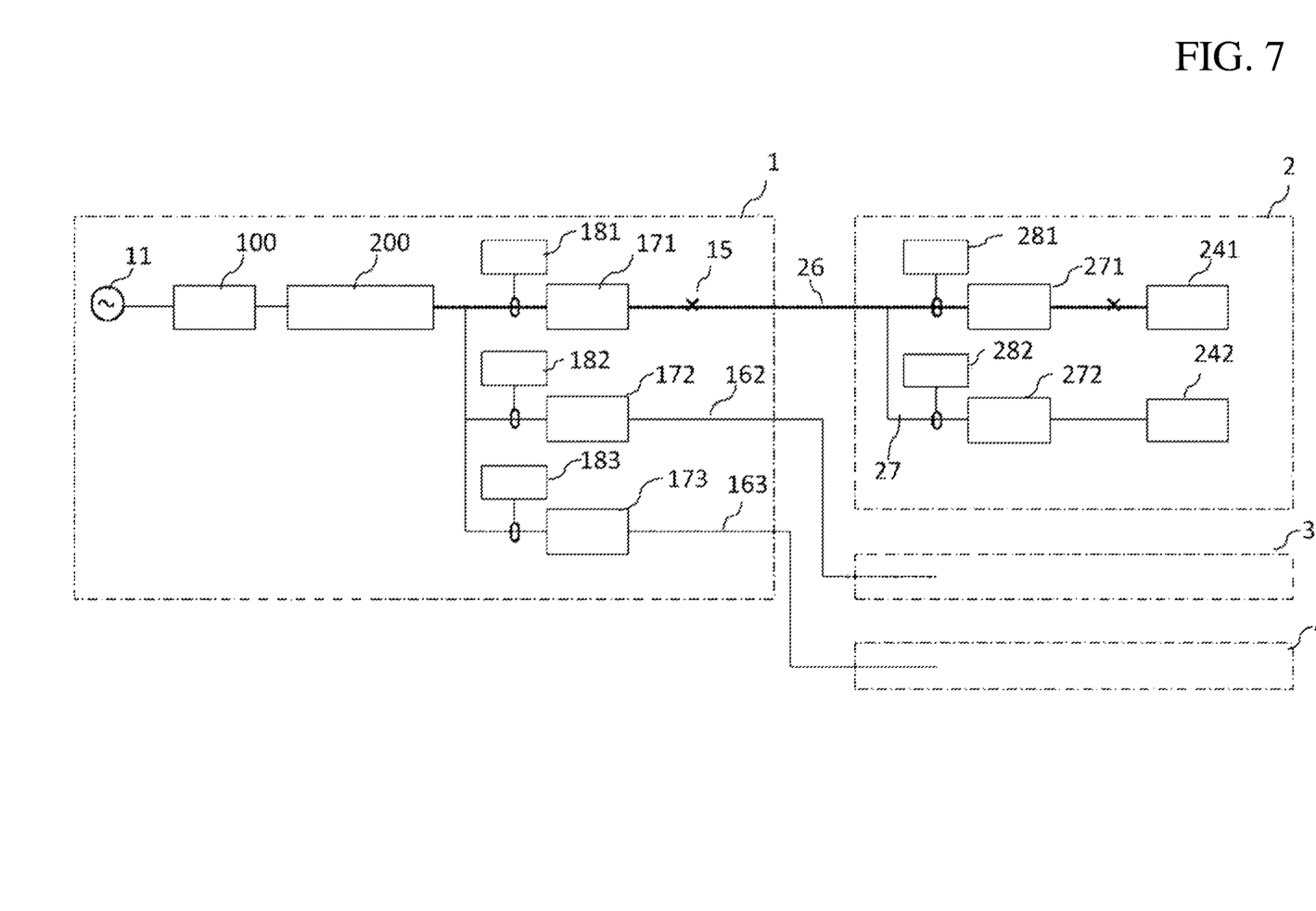
FIG. 7 is a conceptual diagram of another configuration of the DC power distribution system according to Embodiment 1.

Although the current limiting device 200 and the rectifying unit 100 are housed in one case in FIG. 2, by forming the converter 12 using each of the rectifying unit 100 and the current limiting device 200 as separate components as shown in FIG. 7, it is possible to prevent damage to the converter 12 caused by a malfunction of the current limiting device 200, and it is only necessary to replace the current limiting device alone instead of replacing the entire converter. By configuring the converter 12 as a separate component, it is also possible to achieve the same effect as that of Embodiment 1 for short-circuits which have occurred at the point 15 and the point 25.

Embodiment 2

Figure 8:
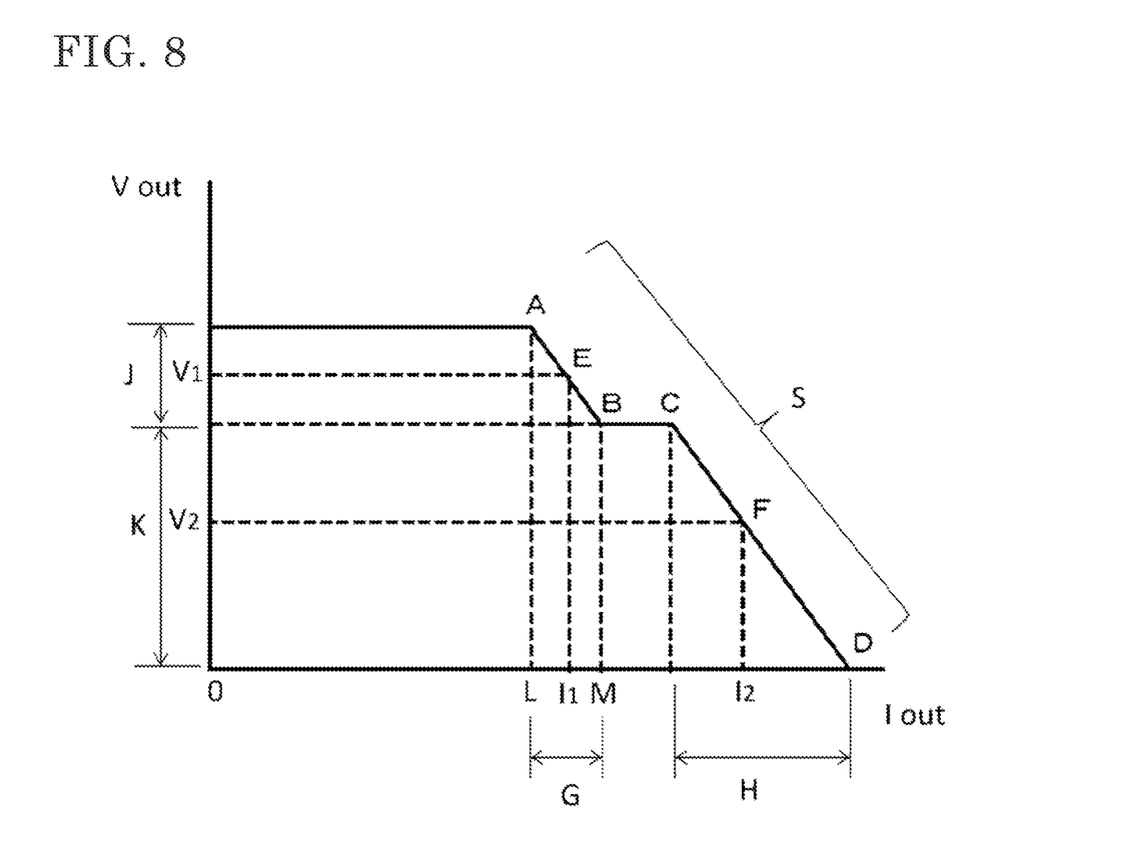
FIG. 8 is a graph showing a constant power drooping characteristic of a converter according to Embodiment 2 of the present disclosure.

FIG. 8 shows an output characteristic (output voltage characteristic-output current characteristic) of a converter 12 according to Embodiment 2 of the present disclosure. The horizontal axis indicates the output current Iout, and the vertical axis indicates the output voltage Vout. As in the case of FIG. 3, a drooping characteristic is provided such that the output current is outputted at a constant rated voltage value from the our current 0 to the rated current value L, whereas the output current decreases below the rated voltage in an overload state in which the output current exceeds the rated current value by some fraction, or a short-circuit state in which the output current further exceeds the overload state.

This characteristic is different from the characteristic according to Embodiment 1 shown in FIG. 3 in that the characteristic line S in FIG. 8 droops in two stages composed of an overload state and a short-circuit state, rather than substantially linearly drooping to the lower right.

More specifically, in the overload state, the relationship between an overload current region extending to the right side (positive side) from the rated current value L and the output voltage corresponding thereto in FIG. 8 changes in the region A-B on the characteristic line S, and a region of the output voltage which corresponds to the overload current region G is the overload voltage region J. In such an output characteristic, the output voltage at the current I1 in the overload state, for example, is the output voltage value V1, which corresponds to the point E on the characteristic line S on the vertical axis.

In the short-circuit state, the relationship between the short-circuit current region and the output voltage corresponding thereto changes in the range of the region C-D on the characteristic line S, and a region of the output voltage which corresponds to the short-circuit current region H is the short-circuit voltage region K. In such an output characteristic, the output voltage at the current I2 in the short-circuit state, for example, is the output voltage value V2, which corresponds to the point F on the characteristic line on the vertical axis.

In this manner, a current limiting function is provided which has a drooping characteristic such that the output current is changed in two stages so as to correspond to the overload voltage region J and the short-circuit voltage region K, and the output current also changes in two stages according to the degree of decrease in the output voltage caused by an overload or a short circuit.

Also, a characteristic is provided such that, when a maximum point (point M) in the overload current region G of the output current is exceeded, the output current is rapidly increased in the region B-C on the characteristic line S shown in FIG. 8, in order to clearly distinguish such a state from the overload state. Accordingly, when the maximum point (point M) in the overload current region G is exceeded, the output current value rapidly increases, and a short-circuit current corresponding to this characteristic of the DC power distribution system is passed within the range of the short-circuit current region H in the region C-D on the characteristic line S.

Figure 9:
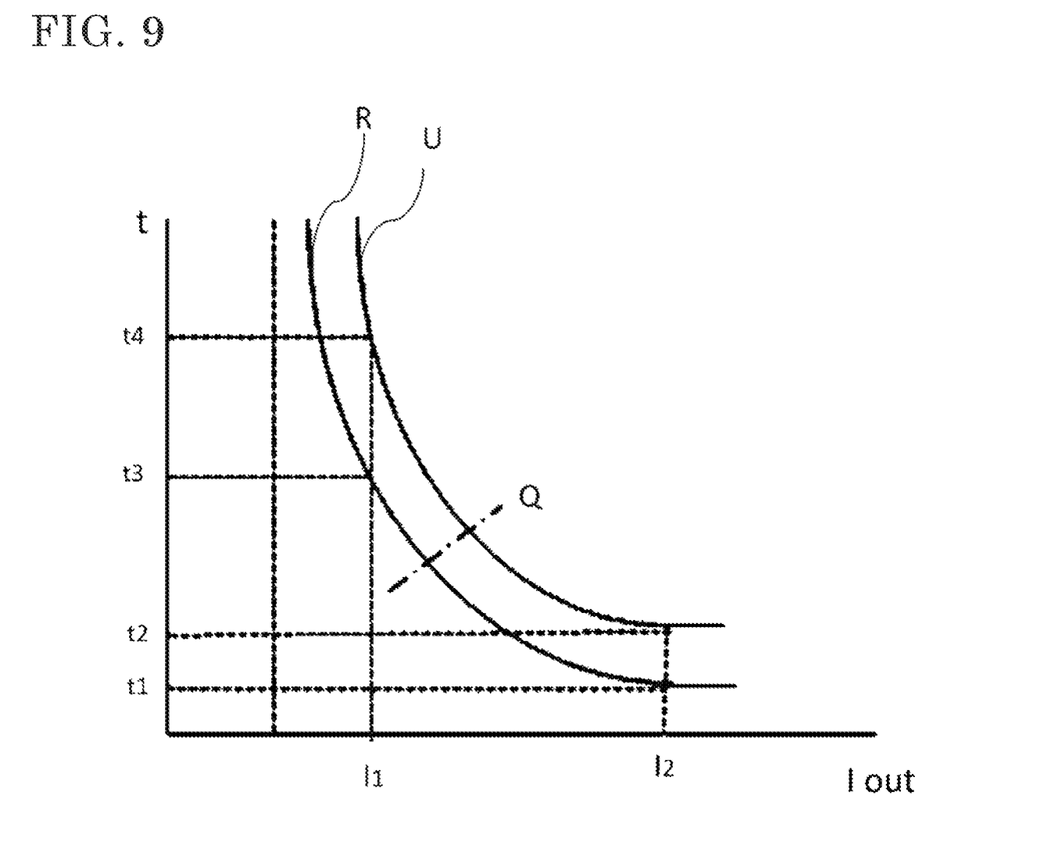
FIG. 9 is a graph showing overcurrent operation curves of relays according to Embodiment 2.

FIG. 9 shows an example of an overcurrent operation curve U of the relay 181 and an example of an overcurrent operation curve R of the relay 281 shown in FIG. 1 which correspond to FIG. 8. The vertical axis indicates the operation start time t of the relays, and the horizontal axis indicates the output current Iout of the converter 12 shown in FIG. 8. The relay 281 operates at the operation start time t3 at the current I1 in the overload state, and operates at the operation start time t1 at the current I2 in the short-circuit state. Similarly, the relay 181 operates at the operation start time t4 at the current I1 in the overload state, and operates at the operation start time t2 at the current I2 in the short-circuit state. In this manner, in the overload state in which the output current exceeds the rated current by some fraction, the difference between the operation start times t3 and t4 of the relay 181 and the relay 231 is set to be as long as possible within the range of a predetermined time which does not cause a failure in the DC power distribution system, thus maintaining conduction of the overload current to avoid a risk of causing a power failure due to an overload. Note that the overcurrent operation curves of the relays in FIG. 9 are also applicable to Embodiment 1.

At the time of occurrence of a short-circuit, the difference between the operation start times t1 and t2 is set to be short, and the relay 181 and the relay 281 are sequentially operated to immediately protect the DC power distribution system. Additionally, when a short-circuit has occurred at the point 25 in FIG. 1, the operation start time t1 of the relay 281 is set be earlier than the operation start time t2 of the relay 181. Thus, the power failure range of the DC power distribution system at the time of occurrence of a short-circuit can be limited to as narrow a range as possible.

In FIG. 9, the period for which the DC power distribution system can conduct a current in the overload state can be increased by setting the characteristic curve of the relay 281 such that the interval between the operation start time t3 in the overload state and the operation start time t1 in the short-circuit state increases, across a maximum point Q of the curvature of the overcurrent operation curve R of the relay 281. Accordingly, the control for limiting the power failure range of the DC power distribution system due to a short-circuit can be easily performed.

Although the above description is given using the relay 181 and the relay 281, the relays 182, 183, or the relay 282 in FIG. 1 is also set so as to satisfy the above-described mutual relationship between the relay 181 and the relay 281.

Embodiment 3

FIG. 1 shows a configuration in which power is supplied from each branch in the electric room 2 to the loads 241 and 242 via the switches 271 and 272; however, also in a configuration in which power is distributed from the output side of the switch 271 to a load in another electric room, the same effect can be achieved by ensuring the operation time period at a short-circuit current between the relay installed in the other electric room and the relay 181 in the electric room 1, and the relays 281 and 282 in the electric room 2, as in the case of the electric room 2.

Embodiment 4

Figure 10:
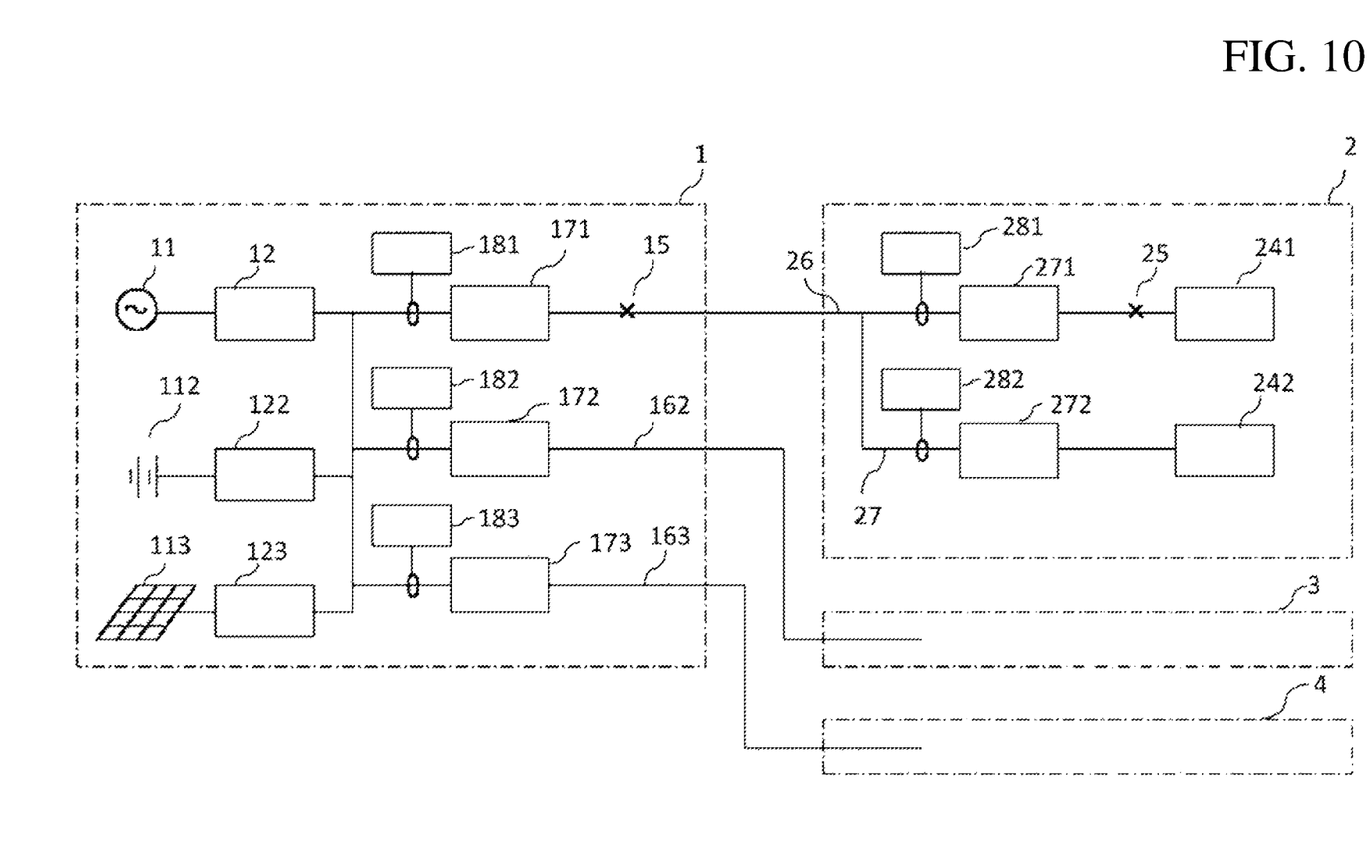
FIG. 10 is a conceptual diagram of a configuration of a DC power distribution system according to Embodiment 4 of the present disclosure.

FIG. 1 shows a system configuration in which power from the commercial power supply 11 is converted into DC power; however, the same effect as that of Embodiment 1 or Embodiment 2 can be achieved for short-circuits which have occurred at the point 15 and the point 25 in a system as shown in FIG. 10 which uses an electricity storage medium 112 and renewable energy 113 such as a solar cell and an aerogenerator, other than the commercial power supply 11, as the power supplies, and which is formed using converters 122 and 123 having a drooping characteristic as shown in FIG. 3 or 9.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 2, 3, 4 electric room
11 commercial power supply
12, 122, 123 converter
26, 27, 162, 163 distribution line
112 electricity storage medium
113 renewable energy
171, 172, 173, 271, 272 switch
181, 182, 183, 281, 282 relay
200 current limiting device
201 current limiting unit
202 current sensor
203 voltage sensor
204 current-limiting control unit
241, 242 load

The invention claimed is:

1. A DC power distribution system comprising:
a converter for converting power from a power supply into DC power;
a plurality of distribution lines branched for supplying power from the converter to a plurality of loads;
a first switch connected between the converter and a branch of each of the distribution lines to open/close an electric path;
a second switch connected between the branch and the corresponding load to open/close an electric path;
a first relay for opening the first switch; and
a second relay for opening the second switch, wherein
the converter limits a current passing through the distribution lines in a short-circuit state, and has a constant power drooping characteristic of passing a current greater than or equal to a rated current through the distribution lines for a fixed time, and
the first and second relays detect the current greater than or equal to the rated current, and have an operating characteristic of hierarchically opening the first and second switches within the fixed time.

2. The DC power distribution system according to claim 1, wherein
the fixed time is a period of 2 seconds or less during which the converter can maintain a function thereof for the current greater than or equal to the rated current, without failing.

3. The DC power distribution system according to claim 1, wherein
the hierarchically opening operating characteristic is to open the second switch before the first switch when a short-circuit has occurred between the branch and the corresponding load, and to open the first switch before the second switch when a short-circuit has occurred between the converter and the branch.

4. The DC power distribution system according to claim 1, wherein
an opening time is differentiated between the first and second switches according to the current value that is greater than or equal to the rated current.

5. The DC power distribution system according to claim 4, wherein the higher the current value, the more advanced the opening time is.

6. The DC power distribution system according to claim 1, wherein
the first relay is connected to the first switch, and the second relay is connected to the second switch.

7. The DC power distribution system according to claim 1, wherein
the first switch and the first relay are each formed by an MCCB or a fuse.

8. The DC power distribution system according to claim 1, wherein
the second switch and the second relay are each formed by an MCCB or a fuse.

9. The DC power distribution system according to claim 1, wherein
the power supply is a commercial power supply, a storage battery, or a power supply using renewable energy.

10. The DC power distribution system according to claim 1, wherein
the constant power drooping characteristic droops in two stages including an overload state and a short-circuit state.

11. The DC power distribution system according to claim 10, wherein
an interval between an overcurrent operation start time of the first relay and an overcurrent operation start time of the second relay is shorter in the short-circuit state than in the overload state.

12. The DC power distribution system according to claim 10, wherein
an output current from the converter is limited in two stages according to a voltage region in the overload state and a voltage region in the short-circuit state.

13. The DC power distribution system according to claim 12, wherein
the output current in the short-circuit state is increased with respect to the output current in the overload state, and is thereafter drooped.

14. The DC power distribution system according to claim 13, wherein
an interval between an overcurrent operation start time of the first relay and an overcurrent operation start time of the second relay is shorter in the short-circuit state than in the overload state.

15. The DC power distribution system according to claim 12, wherein
an interval between an overcurrent operation start time of the first relay and an overcurrent operation start time of the second relay is shorter in the short-circuit state than in the overload state.

* * * * *